United States Patent [19]

Hale

[11] 4,312,560
[45] Jan. 26, 1982

[54] BINOCULAR REFLECTING TELESCOPE

[76] Inventor: Arthur H. Hale, Skaha Estates, R.R. 1, Okanagan Falls, British Columbia, Canada, V0H 1R0

[21] Appl. No.: 83,170

[22] Filed: Oct. 9, 1979

[51] Int. Cl.³ .............................................. G02B 17/00
[52] U.S. Cl. ........................................ 350/27; 350/36; 350/55; 350/75
[58] Field of Search ...................... 350/27, 36, 55, 75, 350/83, 85

[56] References Cited
FOREIGN PATENT DOCUMENTS
768402 10/1967 Canada .................................. 350/55

Primary Examiner—John K. Corbin
Assistant Examiner—Matthew W. Koren
Attorney, Agent, or Firm—Carver & Co.

[57] ABSTRACT

A binocular reflecting telescope for astronomical or terrestrial use having two telescope tubes disposed side by side. Each tube has primary concave mirrors operating as Herschelian Newtonian to direct incident light as a reflected first pencil of light rays towards a plane secondary mirror disposed adjacent a portion of the side wall of the respective tube which is also adjacent the remaining tube. Each secondary reflector reflects rays as a respective second pencil outwardly of the tube into respective eye piece. The second pencils of light rays are reflected generally in the same direction and the eye pieces are generally parallel and spaced apart at an appropriate interocular spacing to provide binocular viewing. Interocular axis extending between optical axes of eye pieces is disposed obliquely to parallel longitudinal axes of tubes to provide comfortable viewing. One tube is movable axially relative to the remaining tube to swing interocular axis to vary interocular spacing.

11 Claims, 11 Drawing Figures

BINOCULAR REFLECTING TELESCOPE

BACKGROUND OF THE INVENTION

1. Field of the Invention

The invention relates to reflecting telescopes of a size particularly adapted for astronomical viewing, but of a type that could be also used for terrestrial viewing.

2. Prior Art

Binocular telescopes are well known, particularly of the small size refracting type which commonly use prisms to reduce overall size of the binoculars to permit easy hand holding. The advantages of binocular viewing are well known, and the importance of matching the viewer's eye spacing with the binocular's interocular spacing has been appreciated for many years. Thus most binoculars have provisions to vary eye piece spacing to accommodate different viewers. Whilst binocular reflecting telescopes have been devised, one of the problems associated with them relates to the difficulty of providing a variable interocular spacing to accommodate different viewers, and also to permit use of the telescope in a comfortable position, particularly for terrestrial viewing. One of the most popular reflecting telescopes is the basic Newtonian type, but this is particularly cumbersome to adapt for binocular viewing, particularly in view of the location of the eye piece relative to the telescope tube.

SUMMARY OF THE INVENTION

The invention reduces difficulties and disadvantages of the prior art by providing a binocular reflecting telescope in which interocular spacing is easily adjustable, and the eye pieces of the telescopes are positioned to provide a relatively comfortable viewing position for both terrestrial and astronomical viewing. Furthermore, selection of a particular optical arrangement for the telescopes permits location of secondary reflectors in such a position as to reduce minimally incident light impinging on the primary reflector and simultaneously permits convenient location of the eye pieces for comfortable viewing with relatively convenient adjustment of interocular spacing.

A binocular reflecting telescope according to the invention has a pair of generally similar telescope tubes disposed side by side with longitudinal axes thereof generally parallel to each other. Each tube has a primary concave mirror adjacent an inner end thereof and an opening adjacent an outer end thereof to accept light from an object being viewed. Each mirror is adapted to direct incident light from the object as a reflected first pencil of light rays. The telescope is further characterized by each tube having a plane diagonal secondary reflector and a respective eye piece associated therewith. Each secondary reflector is disposed adjacent a portion of the side wall of the respective tube which is also adjacent the other tube. Each secondary reflector also is positioned to intercept the respective first pencil of rays which are reflected as a respective second pencil of light rays outwardly of the tube into the respective eye piece. The second pencils of rays are reflected generally in the same direction and the eye pieces are generally parallel and spaced apart at an appropriate interocular spacing to provide binocular viewing.

In one embodiment, one tube is movable axially relative to the remaining tube so that an interocular axis extending between optical axes of each eye piece can be shifted angularly relative to the longitudinal axes of the tubes so as to vary interocular spacing between the eye pieces. In a second embodiment, the interocular axis is disposed obliquely to the longitudinal axes of the tubes to provide comfortable viewing.

A detailed disclosure following, related to drawings, describes a preferred embodiment of the invention which is capable of expression in structure other than particularly described and illustrated.

DESCRIPTION OF THE DRAWINGS

FIG. 5 is a simplified fragmented top plan of a portion of the telescope adjacent a central plane disposed parallel to and between the tubes, details of tube adjustment structure being shown.

DETAILED DISCLOSURE

Figure 1:
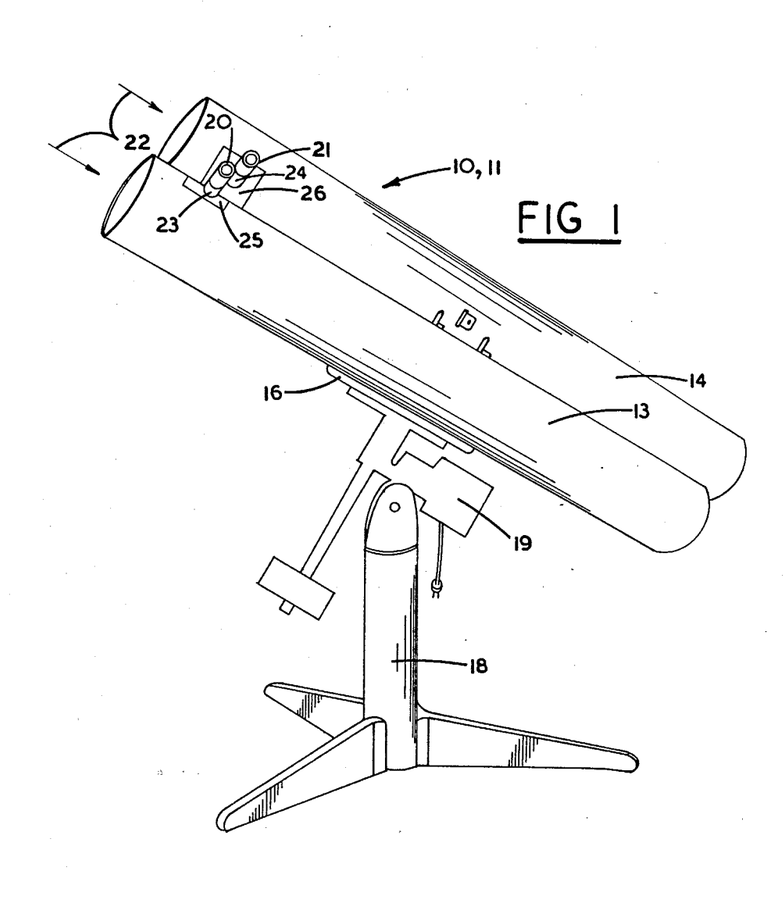
FIG. 1 is a simplified perspective of a preferred embodiment of the invention shown in equatorial mounting.

FIG. 1

A binocular reflecting telescope 10 according to the invention includes a tube assembly 11 having first and second telescope tubes 13 and 14 mounted on a tube base assembly 16. The assembly 16 is carried on a telescope stand 18 and the assembly 16 is adapted for equatorial viewing, as shown. An equatorial tracking mounting 19 disposed between the tube assembly 11 and the stand 18 permits tracking on an object in the heavens, light from the object entering the telescope tubes in direction of arrows 22. A viewer stands or sits by the telescope and views the object through first and second eye pieces 20 and 21 of the tubes 13 and 14 respectively. The eyepieces 20 and 21 are held in eyepiece holders 23 and 24 respectively and sliding cover plates 25 and 26 encircle the eye piece holders 23 and 24 respectively and accomodate swinging of the eyepiece as will be described.

Figure 2:
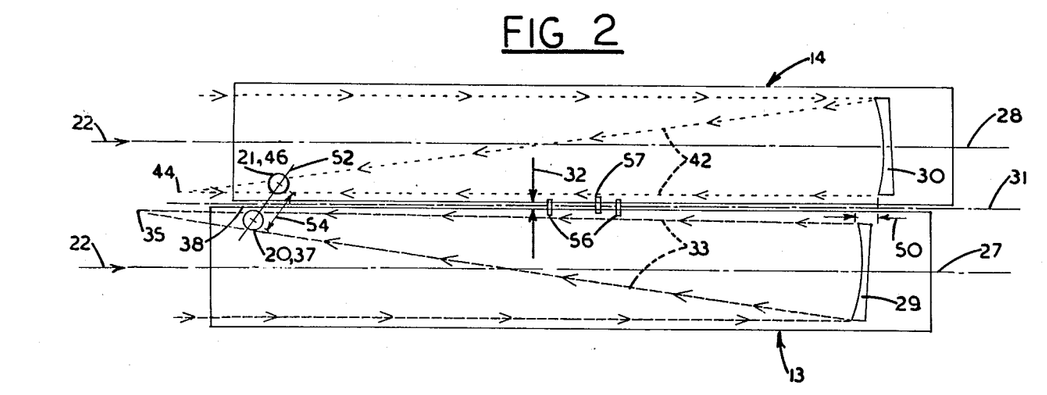
FIG. 2 is a simplified optical ray diagram showing directions of rays within the telescope, as viewed normally to a main plane containing longitudinal central axes of telescope tubes so as to represent a diagrammatic top plan.
Figure 3:
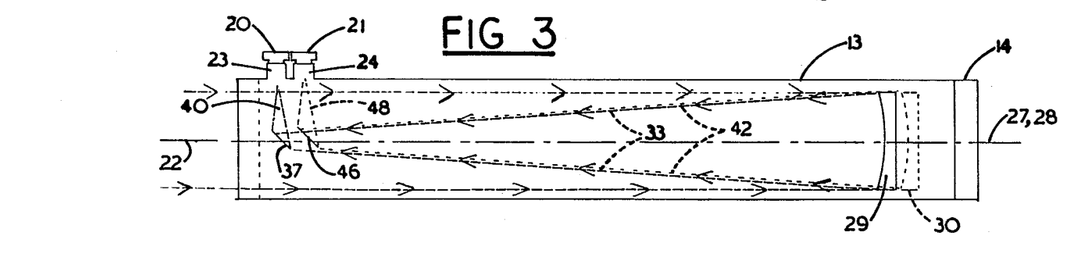
FIG. 3 is a simplified ray diagram as viewed along the plane containing the longitudinal central axes of the tubes, so as to represent a diagrammatic side elevation.

FIGS. 2 and 3

The first and second tubes 13 and 14 are disposed side by side with longitudinal axes 27 and 28 thereof generally parallel to each other. The tubes are disposed generally equally on opposite sides of a parallel central plane 31 extending between and parallel to the tubes which are spaced apart by a gap 32. The tubes 13 and 14 have first and second primary concave mirrors 29 and 30 adjacent inner or rear ends thereof, and openings adjacent the respective outer or front ends thereof to accept light from the object being viewed.

The mirror 29 receives incident light from the object and reflects a first pencil of light rays, designated 33, adapted to converge towards a primary focus 35 of the mirror. The mirror 29 is adapted to operate as a Herschelian Newtonian arrangement in which the focus 35 is displaced from the longitudinal axis 27 of the tube. The mirror 29 can be a 15 to 25 cm diameter spherical or paraboloid mirror tilted slightly so as to function as an off-axis mirror and having a focal ratio of F/8 or greater. Alternatively the mirror 29 can be a portion of a paraboloid ground so as to provide a primary focus displaced from the tube longitudinal axis. A plane diagonal secondary reflector 37 is disposed adjacent a portion 38 of the side wall of the tube 13 which is adjacent the tube 14, i.e. a portion of the telescope tube 13 that is closest to the tube 14. The reflector 37 is spaced between the primary focus 35 and the mirror 29 so as to intercept the first pencil of rays 33 as in a common Herschelian telescope. The first pencil of rays 33 are reflected from the secondary reflector 37 as a second pencil of light rays 40 outwardly of the tube into the eye piece 20, through which the image is viewed.

Similarly, in the tube 14 the primary mirror 30 directs incident light as a first pencil of rays 42 to converge towards a primary focus 44, and a second plane diagonal secondary reflector 46 intercepts the first pencil of rays which are reflected therefrom as a second pencil of rays 48 into the eye piece 21. Both second pencils of rays 40 and 48 in the tubes are reflected generally in the same direction from the respective secondary reflectors, and the respective eye pieces are generally parallel to each other and spaced apart at an appropriate interocular spacing to provide binocular viewing.

As seen in FIG. 2, the mirror 29 is displaced longitudinally forwardly of the mirror 30 by a forward displacement or spacing 50. Thus, for primary mirrors of approximately equal focal lengths, the eye piece 20 and the tube 13 are similarly displaced longitudinally forwardly of the eye piece 21 and the tube 14, although a small difference in focal lengths does not seem to materially affect viewing. An interocular axis 52 connects optical axes of the eye pieces and thus extends between the eye pieces in a plane containing the eye piece axes. The longitudinal displacement of the eye pieces causes the interocular axis to be disposed obliquely to the longitudinal axes 27 and 28 of the tube and this longitudinal displacement is of importance to the invention as it results in a relatively comfortable viewing position, particularly for the equatorial mounting, as shown in FIG. 1. Interocular spacing 54, that is spacing between axes of the eye pieces, is typically about 6.5 cms but, this can be adjusted to accomodate viewers having different interocular spacings. It can be seen that, if one telescope tube is moved axially relative to the remaining telescope tube, the interocular axis 52 is shifted angularly relative to the longitudinal axes 27 and 28 of the tubes, thus changing interocular spacing 54. A pair of spaced tangs 56 extend outwardly from the tube 13 towards the tube 14, and a single tang 57 extends outwardly from the tube 14 towards the tube 13 and is spaced between the tangs 56. The tangs are used for producing lateral movement between the tubes, as will be described.

FIGS. 4 through 7

Preferably one of the telescope tubes is fixed and in this example the tube 13 is selected to be a fixed tube and thus is fixed securely to the tube base assembly 16 by a pair of spaced screw means 61 and an upwardly extending strap means 63. The tube 14 is thus a sliding tube and is constrained to longitudinal sliding relative to the tube 13 by a pair of spaced front and rear tube slide guides 66 and 67 respectively cooperating with the tubes 13 and 14 adjacent outer and inner ends respectively of the tubes, and a base slide guide 69 on the tube 14 cooperating with the base assembly 16.

Figure 4:
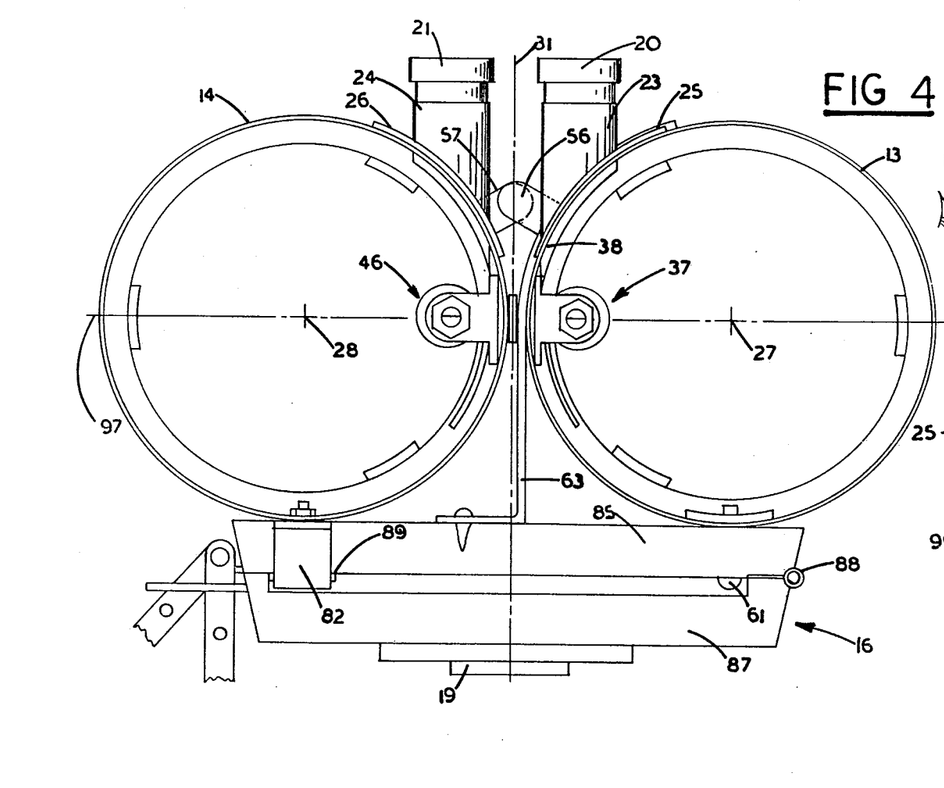
FIG. 4 is a simplified fragmented front elevation of the telescope as viewed along the longitudinal axes of the tubes, the equatorial mounting being folded.

As seen in FIG. 4, the tangs 56 and 57 are inclined towards each other and, as previously described, are spaced apart such that a pair of opposing tangs can be gripped between the fore finger and thumb and squeezed, causing the sliding tube 14 to slide on the base assembly 16 and thus relative to the fixed tube, swinging the interocular axis 52 and varying interocular spacing 54, see FIG. 2.

Figures 5, 8:
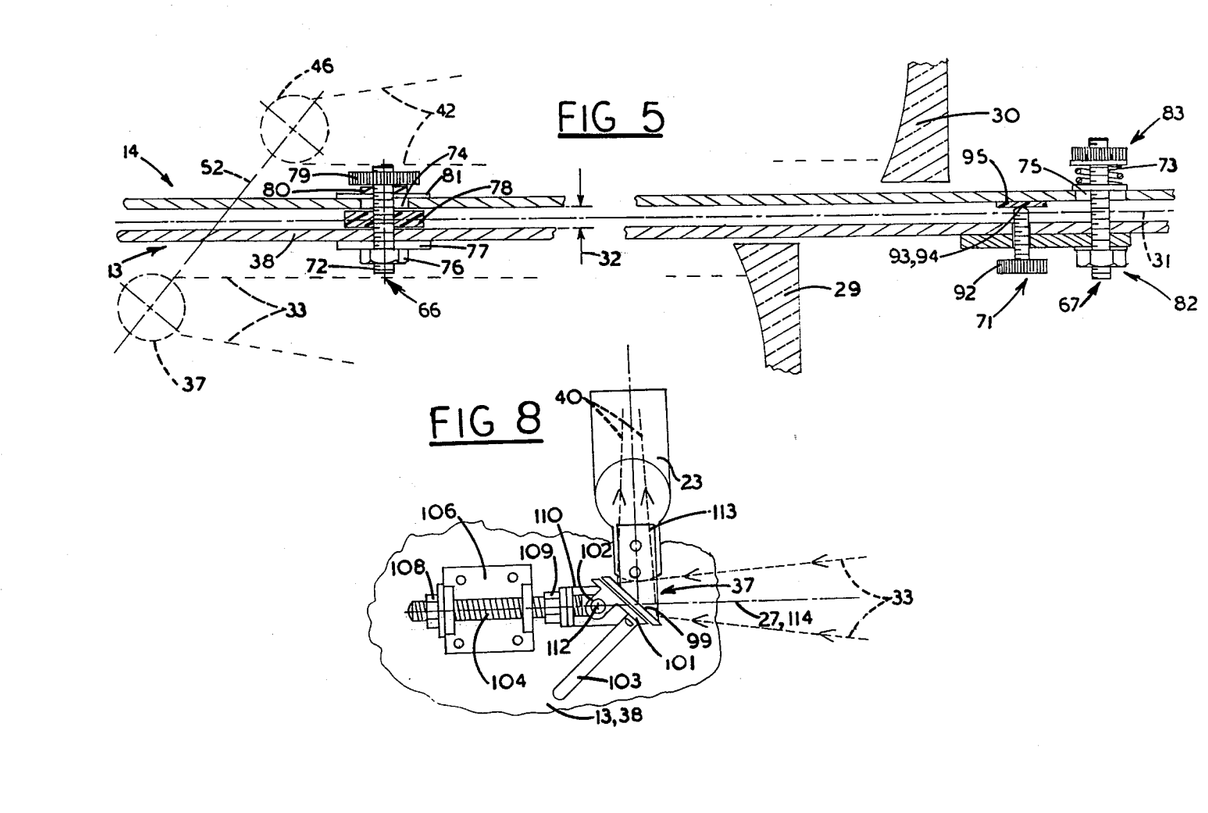
Figure 6:
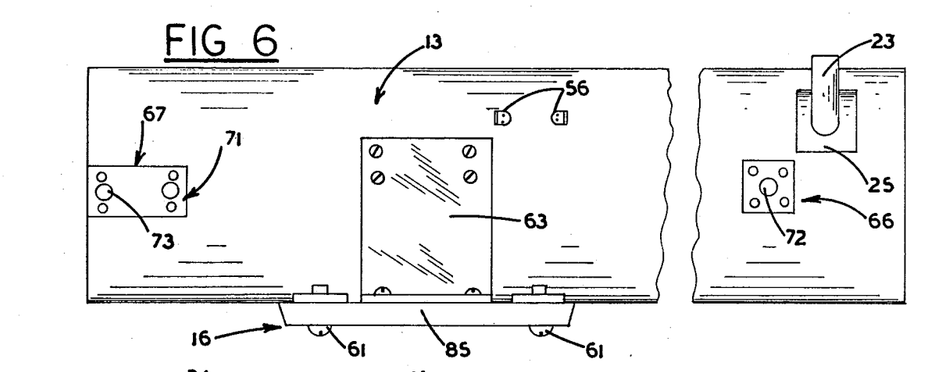
FIG. 6 is a simplified fragmented side elevation of one of the tubes as viewed from the central plane of the telescope disposed between the tubes.

As best seen in FIG. 5, the front and rear tube slide guides 66 and 67 are generally similar and include front and rear guide studs 72 and 73 respectively which extend outwardly from the fixed tube 13 and are received in respective front and rear guide slots 74 and 75 in the sliding tube 14. A tube alignment adjuster 71 is adjacent the stud 73 and is used for accurately aligning the tubes as will be described. The front stud 72 carries a nut 76 and a curved washer 77 within the tube 13, and a low friction plastic washer 78 sandwiched between the tubes 13 and 14. A knurled nut 79, a dished spring washer 80 and a second plastic washer 81 are carried on the stud 72 within the tube 14. The knurled nut 79 can be adjusted to squeeze the tubes 13 and 14 sufficiently close together against the washer 78 to prevent undesirable lateral or rotational movement therebetween, and yet provide sufficiently controlled longitudinal movement of the stud 72 relative to the slot 75, for interocular spacing adjustment. The front stud and associated nuts are sufficiently small to ensure no portion of the front guide 66 obstructs the first pencils 33 and 42 of light rays directed to the secondary reflectors. The rear stud 73 and associated structure are generally similar to the front stud and structure and include a nut and washer combination 82 within the tube 13 and a knurled nut, coil spring and washer combination 83 carried on the stud 73 within the tube 14. A spacing washer carried on the stud 73 is not required between the tubes at the rear end thereof because the alignment adjuster 71 controls tube spacing at the rear end as will be described. The slide guides 66 and 67 serve as guide means adjacent opposite ends of the telescope tubes, each guide means extending from one tube and cooperating with the adjacent tube. The guide means permit axial sliding between the tubes whilst limiting lateral movement therebetween to maintain alignment of longitudinal axes of the tubes.

Figure 7:
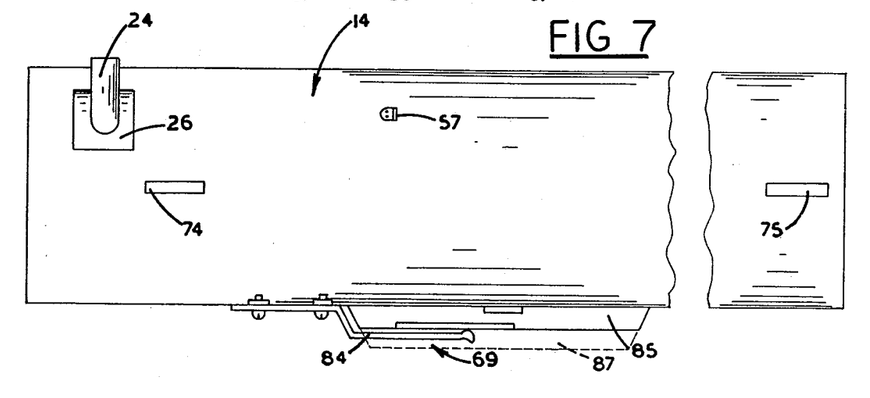
FIG. 7 is a simplified fragmented side elevation of the remaining tube as viewed from the central plane of the telescope, FIG. 8 which appears on sheet 4 of the drawings, is a simplified elevation of a secondary reflector and associated eye piece assembly.

As best seen in FIG. 7, the base slide guide 69 includes an elongated, generally Z-sectioned guide member 84 extending downwardly and axially rearwardly from the sliding tube 14 and adapted to engage a mounting plate 85 of the tube base assembly 16. For equatorial mounting of the telescope, as will be further described with reference to FIG. 10, the plate 85 is hinged to a main base 87 with an elongated hinge 88. The member 84 is sprung to grip the plate 85 so that the tube 14 is restrained against rocking movement relative to the plate 85. This constraint assists in maintaining the tube axes coplanar with each other whilst permitting of the tube 14 axial shifting relative to the plate 85. It can be seen that the member 84 augments axial constraint of the front and rear slide guides 66 and 67 respectively. Low friction plastic slides can be fitted where there is relative movement between the tubes, guides, the plate 85, etc. to facilitate fine adjustment of interocular distance merely by manually squeezing one of the tang 56 and the tang 57. Alternatively, screw thread means, not shown, can be fitted to extend between the tangs 56 and 57 to permit fine screw adjustment, not shown. The tang means 57 and equivalents serve as extension means extending from at least the movable telescope tube to permit longitudinal forces to be applied to the movable tube to cause axial sliding between the tubes so as to vary the interocular spacing 54.

As best seen in FIG. 5, the alignment adjuster 71 includes a knurled alignment screw 92 which is threaded in a reinforced opening in the portion 38 of the tube 13. The reinforced screw 92 has a conical outer end 93 which is accepted in a complementary conical recess 94 in an elongated bearing strip 95. The strip 95 is elongated for ease of holding when fitting between the tubes. It can be seen spring forces from the slide guides 66 and 67 force the outer end 93 onto the plastic strip 95 and that rotating the screw 92 varies the spacing between rear ends of the telescope. Thus rotating the alignment screw 92 varies slightly angular relationship between the axes of the tubes to permit fine adjustment of parallelism between the tubes. Thus there is sufficient lost motion and resilience in guides 66, 67 and 69 to permit the tube 14 to swivel slightly on the plate 85, as will be described for collimation of the telescope. The alignment adjuster 71 thus serves as a telescope tube alignment means cooperating with the telescope tubes to permit limited angular movement between the tubes parallel to a plane 97 containing longitudinal axes of the tubes, to permit collimation of of the telescope as will be described.

Figures 9, 10:
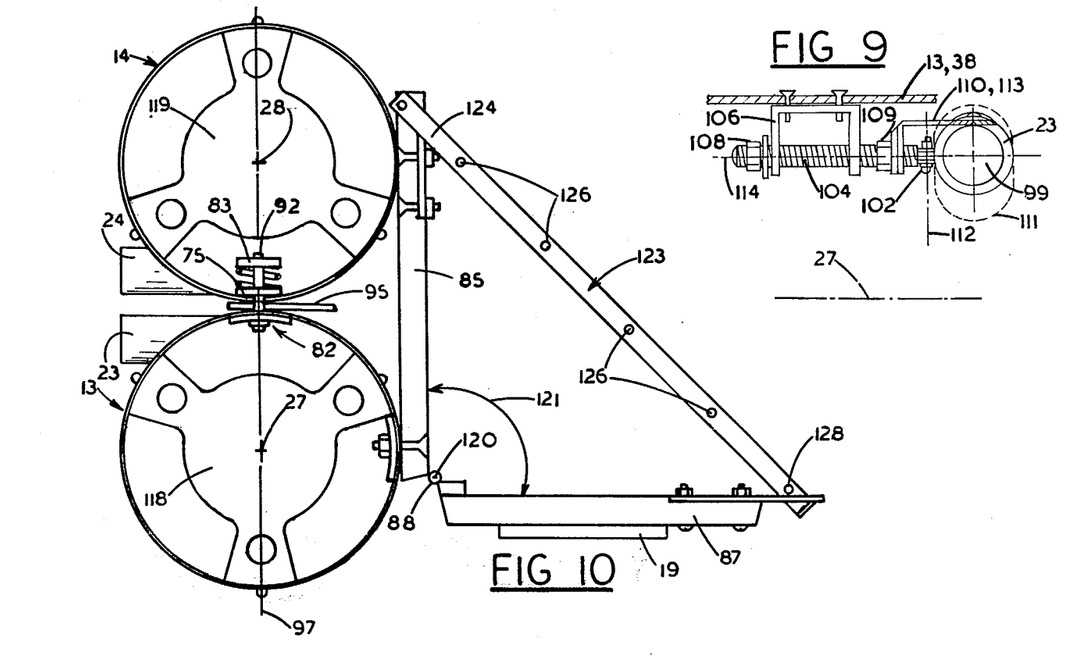
FIG. 9 is a simplified elevation of the secondary reflector and eye piece, as viewed from line 9—9 of FIG. 8.
FIG. 10 is a simplified rear elevation of the telescope assembly shown for equatorial viewing in an extreme position, FIG. 11 which appears on sheet 3 of the drawings, is a simplified fragmented ray diagram illustrating one stage of collimation of the telescope.

FIGS. 8 and 9

The plane diagonal secondary reflectors 37 and 46 are mounted generally similarly best as mirror images of each other, and thus only the reflector 37 and its associated mounting assembly will be described. The reflector 37 has an elliptically shaped plane secondary mirror 99 which is similar to the conventional Newtonian diagonal flat mirror. The mirror 99 is secured to a mirror plate 101 hinged by a hinge pin 102 to an inner end of a longitudinally disposed threaded shaft 104. An adjusting bar 103 extends rearwardly from a rear face of the plate 101 to permit angular adjustment of the plate 101 relative to the shaft 104. The shaft 104 is threaded in a U-shaped bracket 106 secured to the portion 38 of the side wall of the tube 13, and has a locking nut 108 cooperating with an outer end of the shaft 104 and the bracket 106 to prevent rotation of the shaft when correctly positioned. An eye piece bracket 110 is similarly threaded on the inner end on the shaft 104 and is similarly locked thereon with a locking nut 109. The bracket 110 is L-shaped and carries the eye piece holder 23 at an upper end 113 thereof which is positioned so that the eyepiece 20, not shown, receives the second pencil of rays 40 reflected from the plane mirror 99. The eye piece holder 23 extends through a clearance opening 111 on the tube 13, the opening being shown in broken outline in FIG. 9, and being seen more clearly in FIG. 11.

Thus it can be seen that the secondary reflector is mounted for swinging about a transverse axis 112 disposed centrally of the hinge pin 102 and generally normally to the longitudinal axis 27 of the first tube 13. The secondary mirror is also mounted for swinging about a swivel axis 114 extending centrally of the shaft 104 and disposed generally parallel to the longitudinal axis 27 of the tube and normally to the transverse axis 112.

The eye piece holder 23 and thus the eyepiece 20 are therefore mounted for swinging about the swivel axis 114 and thus the clearance opening 111 in the tube 13 is an elongated transverse slot normal to the axis 27 to accommodate lateral swinging of the eye piece holder. To reduce light passing through the slot into the tube, the sliding curved cover plate 25, best seen in FIGS. 1 and 11, encloses the eye piece holder 23 and overlaps the clearance opening 111 by lying on the outside of the tube 13 to move with the eye piece and cover the opening for all positions of the eye piece. To reduce undesirable coma effects arising from the Herschelian primary mirrors, the eye pieces could be tilted, not shown, or optical elements of the eye pieces could be de-centered.

FIG. 10

Inner ends of the tubes 13 and 14 are fitted with conventional mirror alignment means 118 and 119 for adjusting the angle of the optical axes of the primary mirrors 29 and 30 relative to the longitudinal axes of the tubes so as to direct the first pencils of rays towards the respective secondary reflectors, as will be described.

The mounting plate 85 cooperates with the telescope tubes 13 and 14 to assist in maintaining the tubes in alignment and coplanar, ie. so that the longitudinal axes 27 and 28 of the tubes are within the common plane 97, and also to permit swinging of the assembly about a hinge axis 120 of the elongated hinge 88 relative to the main base 87. The hinge axis 120 is generally parallel to the longitudinal axes 27 and 28 of the tubes to attain the desired angular relationships. The main base 87 is mounted on the equatorial tracking mounting 19 to rotate as required for tracking an astronomical object. The mounting plate 85 can be swung about the axis 120 to be disposed at a required angle 121 relative to the base 87, which angle is dependent on the latitude of the viewer. A locating strut 123 is hinged at an upper end 124 to an outer end of the plate 85 adjacent the fixed tube 13, and has a plurality of openings 126 extending along its length, the openings being adapted to accept a transverse pin 128 which engages the main base 87 to lock the strut 123 to the base 87, thus fixing the angle 121 between the plate 85 and base 87. If the viewer moves appreciably from his original latitude, the pin 128 is moved and fitted in a different opening so as to attain the appropriate angle.

Thus, in summary, it can be seen that the mounting plate 85 is a first base member which is secured to the first telescope tube so as to extend from a position adjacent a lower surface of the first tube. The first base member and the first telescope tube have guide means to support the remaining second tube to permit lateral sliding between the tubes to vary interocular spacing.

The main base 87 is a second base member hinged to the first member so as to permit rotation of the first member about the hinge axis which is disposed generally parallel to the longitudinal axes of the telescope tubes. The second base member is carried on a mounting which can be swivelled about an axis to provide equatorial mounting of the telescope, or if desired, an alternative azimuthal mounting of the telescope can be substituted. In this alternative mounting, not shown, the main base 87 is eliminated and the mounting plate 85 is secured directly onto a gimbal type mounting, or other means to permit azimuthal swivelling of the telescope tubes.

OPERATION

Once collimated, the telescope is operated as a normal telescope, in either equatorial or azimuthal mounting, and can be used for astonomical and terrestrial viewing. However, the collimation of the telescope is critical and to reduce time for collimation and to reduce the risks of a poorly collimated instrument, the following procedure is preferred.

All fasteners and mechanical connections of the telescope on its mounting should be sufficiently tight to prevent undesirable movement, but the telescope tube 14 should be free for longitudinal sliding with negligible lateral or rotational movement. An eye piece template, not shown, is made from stiff sheet material about 0.25 to 0.5 mm thick and has two spaced openings therein to receive the eye pieces holders 23 and 24 spaced at the particular interocular spacing for the viewer. The template should have sufficient thickness to maintain the eye piece holders generally parallel to each other.

The telescope is set on its mounting so that the telescope tubes are levelled, that is the plane 97 connecting the tube axes 27 and 28, FIG. 4 is horizontal, and the tubes face a well lit object. The tube 14 is slid on the base until the interocular spacing 54, FIG. 2, equals the spacing of the opening in the template at which time the template is placed over the eye piece holders. Both the holders are then plumbed to be vertical and are then true and parallel and can be taped to the template with masking tape to hold them in the desired location.

Figure 11:
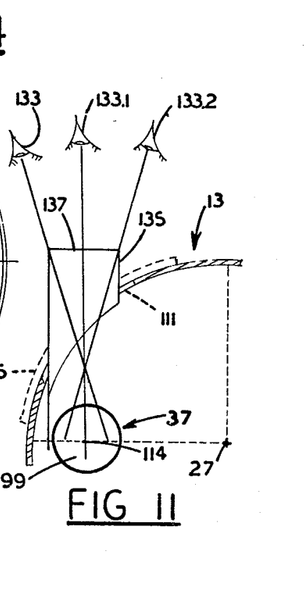

FIG. 11

After plumbing the eye piece holder 23, the plane diagonal secondary reflector 37 is adjusted by looking into the empty holder 23, whilst keeping the eye central and adjusting the reflector 37 so as to centrally reflect the primary mirror 29. The reflector 37 must be disposed centrally of the eye piece holder before proceeding. With the eye piece 20 still removed from the eye piece holder 23, the primary mirror 29 is adjusted by positioning the observer's eye in several positions, some of which are shown schematically at 133, 133.1 and 133.2. The observer's head is held about 40 to 50 cms above the holder 23, and the observer sights along an upper edge 137 of the holder until the reflection of the opposite edge of the outer end of the telescope tube is seen in the secondary reflector. Usually this reflection is located towards the center of the secondary reflector 37 and the primary mirror 29 is adjusted so that an edge of the outer end of the telescope tube appears equally from all sides of the eye piece holder.

The procedure above is repeated for the primary mirror 30 and the secondary reflector 46 so that both telescopes are individually collimated. When both telescopes are individually collimated, a straight member, such as a piece of rod, not shown, is fixed above the telescope at a spacing of about 2 m from the eye piece holders and is aligned with the interocular axis 52, FIG. 2. The observer then stands about 2 m in front of the telescope tubes and observes the reflection of the rod in both the diagonal secondary reflectors. If the reflections of the rod in the secondary reflectors are not aligned with each other, one of the secondary reflectors is adjusted horizontally, ie. is swung about the transverse axis 112, to align the reflections of the rod.

To complete the collimation, the binocular is then pointed at a significant distant object of about 2 to 4 km distance, and the eye pieces 20 and 21 are inserted into the holders 23 and 24 for simultaneous viewing. The images of the object are then focussed and most likely the images will be overlapping or separated, with one reflection higher than the other with vertical and horizontal lines of the images nonaligned. The observer looks through the eye pieces, and again swings one or both of the secondary reflectors, about the respective transverse axis 112 so as to level the images. Next, the secondary reflectors are swivelled by rotating about the respective swivel axis 114 to correct the vertical and horizontal lines of the object. Lastly, the tube alignment means 71 is adjusted at the rear end of the tubes so as to make the images coincide. The alignment means 71 is a very fine adjustment that is usually required after the relatively coarse adjustment of tilting and swivelling the primary mirrors and secondary reflectors. When the images are almost coincident, it is preferred to close the eyes for a moment to rest them and then, immediately after opening the eyes, for a brief moment the difference in images will be apparent and final adjustment can be made to produce coincident images providing essentially true binocular viewings.

In summary, the initial alignment of the primary mirrors by sighting through the empty eye piece holders can be considered to be an initial coarse adjustment, and the adjustment of the two secondary mirrors using the straight member is also relatively coarse, but simple and routine. However, the final fine adjustment using the means 71 is of major importance to the invention and, after practise, can be completed in a comparatively short time.

I claim:

1. A binocular reflecting telescope having a pair of generally similar telescope tubes disposed side by side with longitudinal axes thereof generally parallel to each other, each tube having a primary concave mirror adjacent an inner end thereof and an opening adjacent an outer end thereof to accept light from an object being viewed, each mirror being adapted to direct incident light from the object as a reflected first pencil of light rays, the telescope being further characterized by:
   (a) each tube having a plane diagonal secondary reflector and a respective eye piece associated therewith, each secondary reflector being positioned to intercept the respective first pencil of rays which are reflected as a respective second pencil of light rays outwardly of the tube into the respective eye piece, the second pencils of rays being reflected generally in the same direction and the eye pieces being generally parallel and spaced apart at an appropriate interocular spacing to provide binocular viewing,
   (b) one tube being movable axially relative to the remaining tube so that an interocular axis extending between optical axes of each eye piece can be shifted angularly relative to the longitudinal axes of the tubes so as to vary interocular spacing between the eye pieces.

2. A telescope as claimed in claim 1 further characterized by:
   (a) the interocular axis extending between optical axes of the eye pieces being disposed obliquely to the longitudinal axes of the tubes to provide comfortable viewing.

3. A telescope as claimed in claim 1 further characterized by:
   (a) one tube being movable axially relative to the remaining tube so that the interocular axis extending between optical axes of each eye piece can be shifted angularly relative to the longitudinal axes of the tubes so as to vary interocular spacing between the eye pieces.

4. A telescope as claimed in claim 1 further characterized by:
   (a) each secondary reflector is mounted for swinging about a transverse axis disposed generally normally to longitudinal axes of the tubes, and for swinging about a swivel axis disposed generally parallel to the longitudinal axis of the tubes.

5. A telescope as claimed in claim 1 or 3 further characterized by:
   (a) extension means extending from the movable telescope tube to permit longitudinal forces to be applied to the movable telescope tube to cause axial sliding between the tubes so as to vary interocular spacing.

6. A telescope as claimed in claim 1 or 3 further characterized by:
   (a) a first base member, the base member being secured to a first telescope tube so as to extend from a position adjacent a lower surface of the first tube, the first base member and first telescope tube having guide means to support the remaining second tube to permit lateral sliding between the tubes.

7. A telescope as claimed in claim 6 further characterized by:
   (a) guide means adjacent opposite ends of the telescope tubes, each guide means extending from one tube and cooperating with the adjacent tube so as to permit axial sliding between the tubes whilst limiting lateral movement therebetween so as to maintain alignment of longitudinal axes of the tubes.

8. A telescope as claimed in claim 1 in which the primary mirror of each tube is a portion of a paraboloid disposed so as to direct the reflected first pencil of rays at an angle to the optical axis of the tube.

9. A telescope as claimed in claim 1 further characterized by:
   (a) telescope tube alignment means cooperating with the telescope tubes to permit limited angular movement between the tubes parallel to a plane containing longitudinal axes of the tubes, to permit collimation of the telescope.

10. A telescope as claimed in claim 6 further characterized by:
    (a) a second base member hinged to the first base member so as to permit rotation of the first member about a hinge axis disposed generally parallel to the longitudinal axes of the telescope tubes,
    (b) means to locate the first base member at a desired inclination relative to the second base member,
    (c) mounting means carrying the second base member to permit swivelling of the second base member about an axis to provide equatorial mounting of the telescope.

11. A binocular reflecting telescope having a pair of generally similar telescope tubes disposed side by side with longitudinal axes thereof generally parallel to each other, each tube having a primary concave mirror adjacent an inner end thereof and an opening adjacent an outer end thereof to accept light from an object being viewed, each mirror being adapted to direct incident light from the object as a reflected first pencil of light rays, the telescope being further characterized by:
    (a) each tube having a plane diagonal secondary reflector positioned to intercept the respective first pencil of rays which are reflected as a respective second pencil of light rays outwardly of the tube, the second pencils of rays of each tube being reflected generally in the same directions,
    (b) each tube having an eye piece associated with a respective secondary reflector and positioned to receive the second pencil of light rays from the respective secondary reflector, the eye pieces being generally parallel and spaced apart at an appropriate interocular spacing to provide binocular viewing, an interocular axis extending between optical axes of the eye pieces being disposed obliquely to the longitudinal axes of the tubes to provide comfortable viewing.

* * * * *